US 6,674,004 B2

(12) United States Patent
Ito et al.

(10) Patent No.: US 6,674,004 B2
(45) Date of Patent: Jan. 6, 2004

(54) WIRE HARNESS

(75) Inventors: Takeharu Ito, Yokkaichi (JP); Mikio Uchida, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 10/166,826

(22) Filed: Jun. 10, 2002

(65) Prior Publication Data

US 2003/0006057 A1 Jan. 9, 2003

(30) Foreign Application Priority Data

Jun. 11, 2001 (JP) ........................................ 2001-176183

(51) Int. Cl.[7] ................................................. H02G 3/04
(52) U.S. Cl. ..................... 174/68.3; 174/68.1; 174/135; 174/72 C; 248/68.1; 439/207
(58) Field of Search ................................ 174/68.3, 68.1, 174/72 C, 48, 135, 70 C, 21 R, 24; 248/68.1; 439/207

(56) References Cited

U.S. PATENT DOCUMENTS

| 4,992,626 | A | * | 2/1991 | Monroe | ................ | 174/68.3 X |
| 5,131,613 | A | * | 7/1992 | Kamiya et al. | ............ | 248/74.3 |
| 5,352,855 | A | * | 10/1994 | Potter | .......................... | 174/135 |
| 5,367,126 | A | * | 11/1994 | Kikuchi | ..................... | 174/71 R |
| 6,149,109 | A | * | 11/2000 | Stankowski | | |
| 6,185,791 | B1 | * | 2/2001 | Khokhar | ................... | 24/16 PB |
| 6,186,451 | B1 | * | 2/2001 | Benoit | ...................... | 248/74.3 |
| 6,332,479 | B1 | * | 12/2001 | Ko | ........................ | 174/68.3 X |
| 6,364,828 | B1 | * | 4/2002 | Yeung et al. | ............. | 174/68 X |

FOREIGN PATENT DOCUMENTS

| JP | 09-159066 | 6/1997 |
| JP | 11-150840 | 6/1999 |

* cited by examiner

*Primary Examiner*—Dhiru R Patel
(74) *Attorney, Agent, or Firm*—Harness, Dickey & Pierce, P.L.C.

(57) ABSTRACT

A wire harness has a trunk line, a branch line and a wire tie member. The trunk line includes a bundle of wires. The branch line branches from the trunk line at a branch portion, and has at least one wire. The wire tie member has a tie strap and a buckle. A non-tying portion of the tie strap passes through and extends beyond the buckle. A tying portion of the tie strap encircles and holds the bundle of wires of the trunk line adjacent the branch portion. The branch line is disposed along and is tightly secured to the non-tying portion of the strap. The non-tying portion supports the branch line in a predetermined routing orientation.

13 Claims, 11 Drawing Sheets

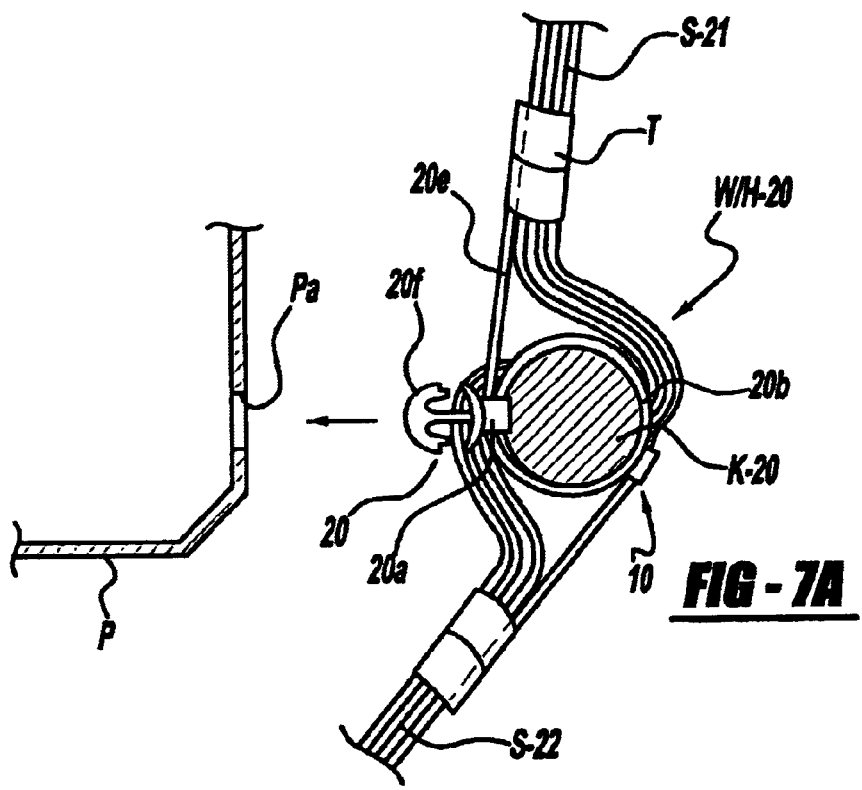
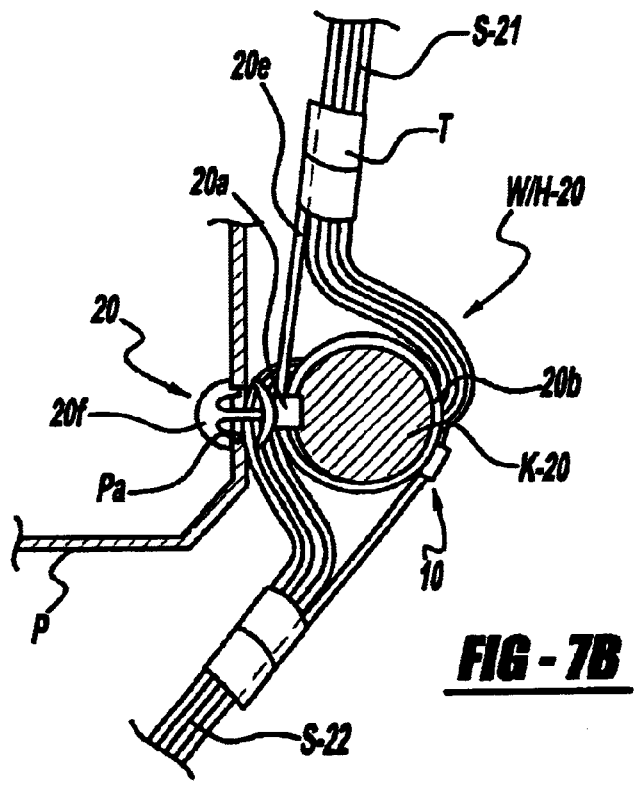

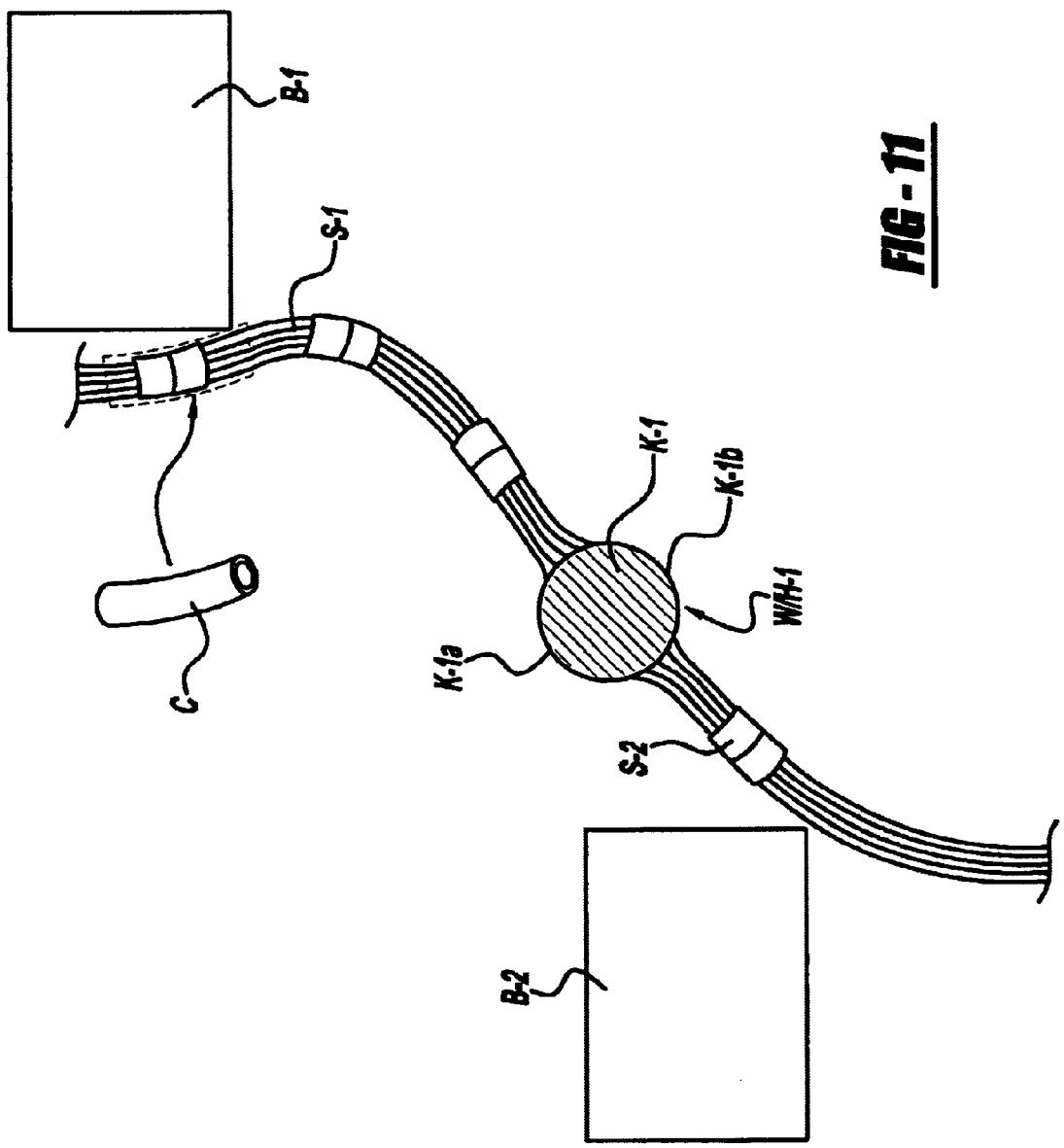

WIRE HARNESS

CROSS-REFERENCE TO RELATED APPLICATIONS

This application claims priority to Japanese Patent Application No. 2001-176183 filed Jun. 11, 2001, which application is hereby expressly incorporated by reference.

FIELD OF THE INVENTION

The present invention generally relates to a wire harness, in particular, to a wire harness which ensures that a branch line can be supported in a predetermined routing orientation.

BACKGROUND OF THE INVENTION

A wire harness, which is produced by combining a plurality of wires, is wired throughout a vehicle body to form various kinds of electrical circuits.

FIG. 9 shows part of a conventional production process for a wire harness W/H-1 as shown in FIG. 10(A). These wire harness W/H-1 include two groups of wires D-1, D-2. The wires D-1, D-2 are set in jigs J upstanding from a flat plate-shaped assembly board Z. Tape T is wound on the wires at predetermined locations to bundle the wires, then necessary parts such as clips, protection parts and connectors are attached to the wires.

As shown in FIG. 10(A), the wire harness W/H-1 has a trunk line K-1 and branch lines S-1, S-2. The branch lines S-1, S-2 branch from the trunk line K-1 at branch portions to form predetermined electrical circuits. The tape T is also wound on the branch portions to prevent slack in the branch. The wire harness W/H-1 is manufactured on a flat surface of the assembly board. Accordingly, the wire harness W/H-1 is formed into a generally two-dimensional configuration. The branch lines S-1, S-2 extend generally two dimensionally relative to the trunk line K-1, as shown in FIGS. 10(B) and 10(C).

However, it is often necessary to install and route the thus constructed wire harness W/H-1 to the vehicle body in a specified orientation. For example, as shown in FIGS. 10(B) and 10(C), the trunk line K-1 must be routed so that an upper peripheral surface K-1a faces upwardly. A lower peripheral surface faces downwardly. The branch lines S-1, S-2 must be routed three-dimensionally relative to the trunk line K-1 to extend and connect to on-vehicle electronic devices (not shown). More specifically, the branch line S-1 must be routed to extend upwardly, while the branch line S-2 must be routed to extend diagonally downwardly toward the left, as shown in FIG. 11.

The above prior art construction has the following drawbacks. First, the branch lines S-1, S-2 are manufactured so that they extend generally two-dimensionally from the trunk line K-1. Thus, to route the branch lines S-1, S-2 in the proper orientations as described above (i.e., in three-dimensional orientations), the branch lines S-1, S-2 must be forcibly bent. This causes root portions of the branch lines S-1, S-2 to bulge, and take up considerably routing space. Particularly, in cases where the wire harness W/H-1 is used in small-sized vehicles, it is difficult to secure sufficient routing space. Thus, routing the wire harness W/H-1 itself is difficult.

Second, even if the branch lines S-1, S-2 are forcibly bent, it is difficult to keep them oriented properly due to the restoring forces of the bundles of wires that constitute the branch lines S-1, S-2. Thus, the branch lines S-1, S-2 might be routed off the predetermined routing paths causing interference with surrounding parts B-1, B-2. More particularly, if the branch lines S-1, S-2 interfere with edge portions of the parts B-1, B-2, the wires of the branch lines S-1, S-2 may be damaged or in the worst case, broken. To prevent any damage to the wires, it is necessary to attach a protection member such as a protection tube C to an area where the wire damage or breakage is likely to take place. This increases material and production costs.

SUMMARY OF THE INVENTION

The present invention has been developed, taking the above problems into consideration. The invention aims to ensure that a branch line of a wire harness may be supported in a predetermined routing orientation.

In a preferred form, the present invention includes a wire harness having a trunk line, a branch line and a wire tie member. The trunk line includes a bundle of wires. The branch line branches from the trunk line at a branch portion, and has at least one wire. The wire tie member has a tie strap and a buckle. A non-tying portion of the tie strap encircles and holds the bundle of wires of the trunk line adjacent the branch portion. The branch line is disposed along and is tightly secured to the non-tying portion of the tie strap. Hence, the branch line can be supported in a predetermined routing orientation relative to the trunk line.

In one aspect of the present invention, the wire tie member is mounted in such a manner that the non-tying portion of the tie strap projects in substantially the same orientation as the predetermined routing orientation of the branch line.

In a further aspect of the present invention, a securing member tightly secures the branch line to the non-tying portion of the tie strap. Preferably, the securing member is an adhesive tape.

In a further aspect of the present invention, the securing member is secured at least near a protruding end of the non-tying portion. This prevents the protruding end from moving away from the branch line. In turn, this prevents interference with surrounding parts when the branch line is routed in the predetermined routing orientation.

In another aspect of the present invention, the wire tie member has an engaging portion projecting from the buckle to engage the branch portion to a panel member. The engaging portion may be provided along an axis of the tie strap in a pre-mounting condition. Alternatively, the engaging portion may be offset from an axis of the tie strap in a pre-mounting condition. Preferably, the wire tie member is a one-piece unitary member made of resin.

In another preferred form, the present invention provides a wire harness with a trunk line, a branch line and a wire tie member. The trunk line includes a bundle of wires. The branch line branches from the trunk line at a branch portion, and has at least one wire. The tie member has a tie strap to encircle the bundle of wires of the trunk line. The tie member further has a buckle at one end of the strap. The buckle is configured to enable the other end of the tie strap to pass through the buckle and engage the tie strap intermediate the ends to secure the tie strap in place on the bundle of wires. A non-tying portion extends between the other end of the tie strap and the buckle. The non-tying portion projects in substantially the same orientation as a predetermined routing orientation of the branch line. The wire tie member is mounted adjacent the branch portion. The branch line is disposed along, and is tightly secured to the non-typing portion. Hence, the branch line is supported in the predetermined routing orientation relative to the trunk line.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7(A) is a schematic cross-sectional view illustrating a process of installing to the vehicle body the wire harness according to the second embodiment of the present invention;

FIG. 7(B) is a schematic cross-sectional view illustrating a condition in which the wire harness according to the second embodiment of the present invention is installed to the vehicle body;

FIG. 11 is a schematic cross-sectional view illustrating a condition in which the conventional wire harness is installed to the vehicle body.

DETAILED DESCRIPTION OF THE PREFERRED EMBODIMENTS

The preferred embodiment of the present invention will be described hereinafter with reference to the drawings.

Figure 1:
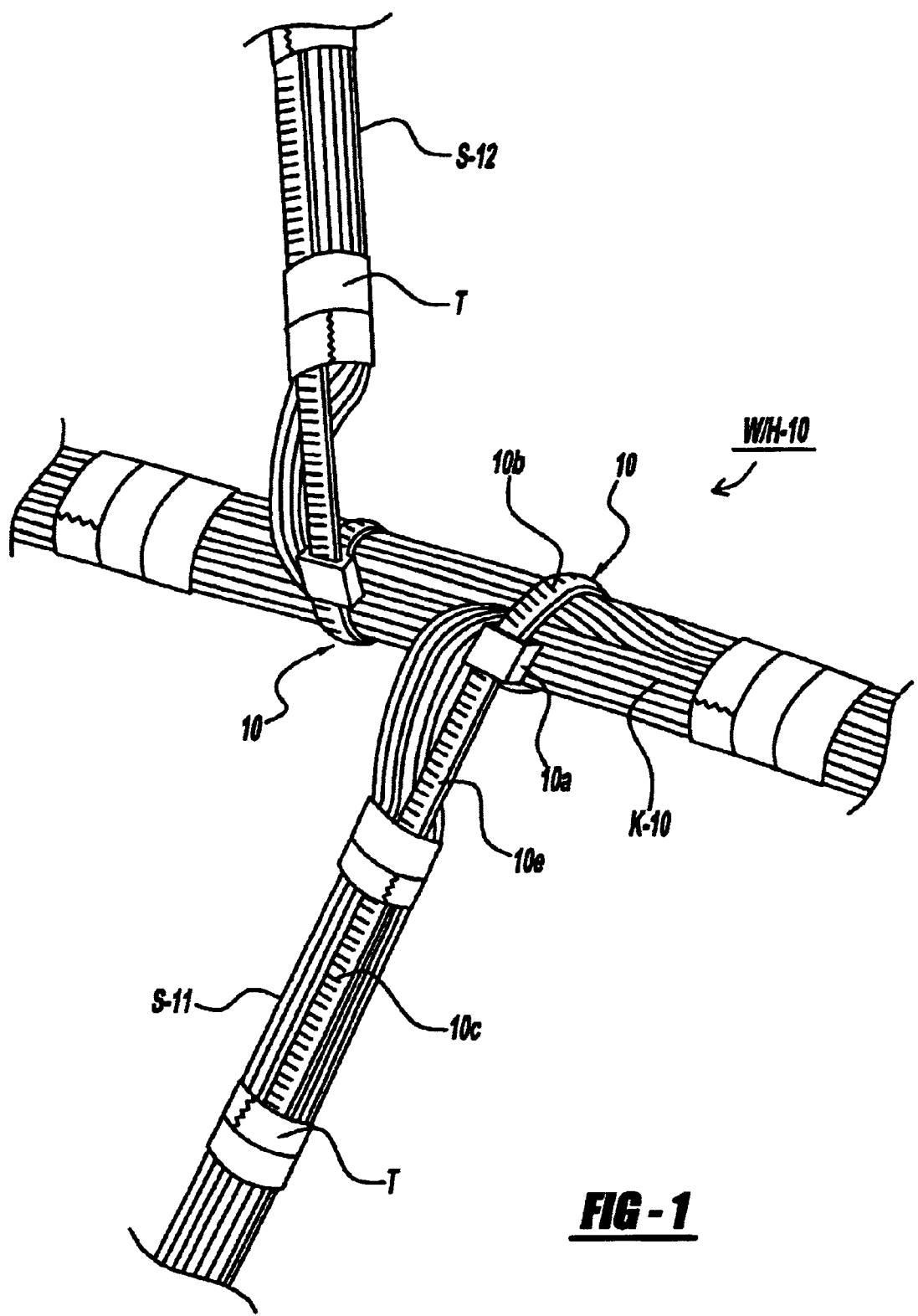
FIG. 1 is a perspective view illustrating the branch portions of a wire harness according to the first embodiment of the present invention.
Figure 9:
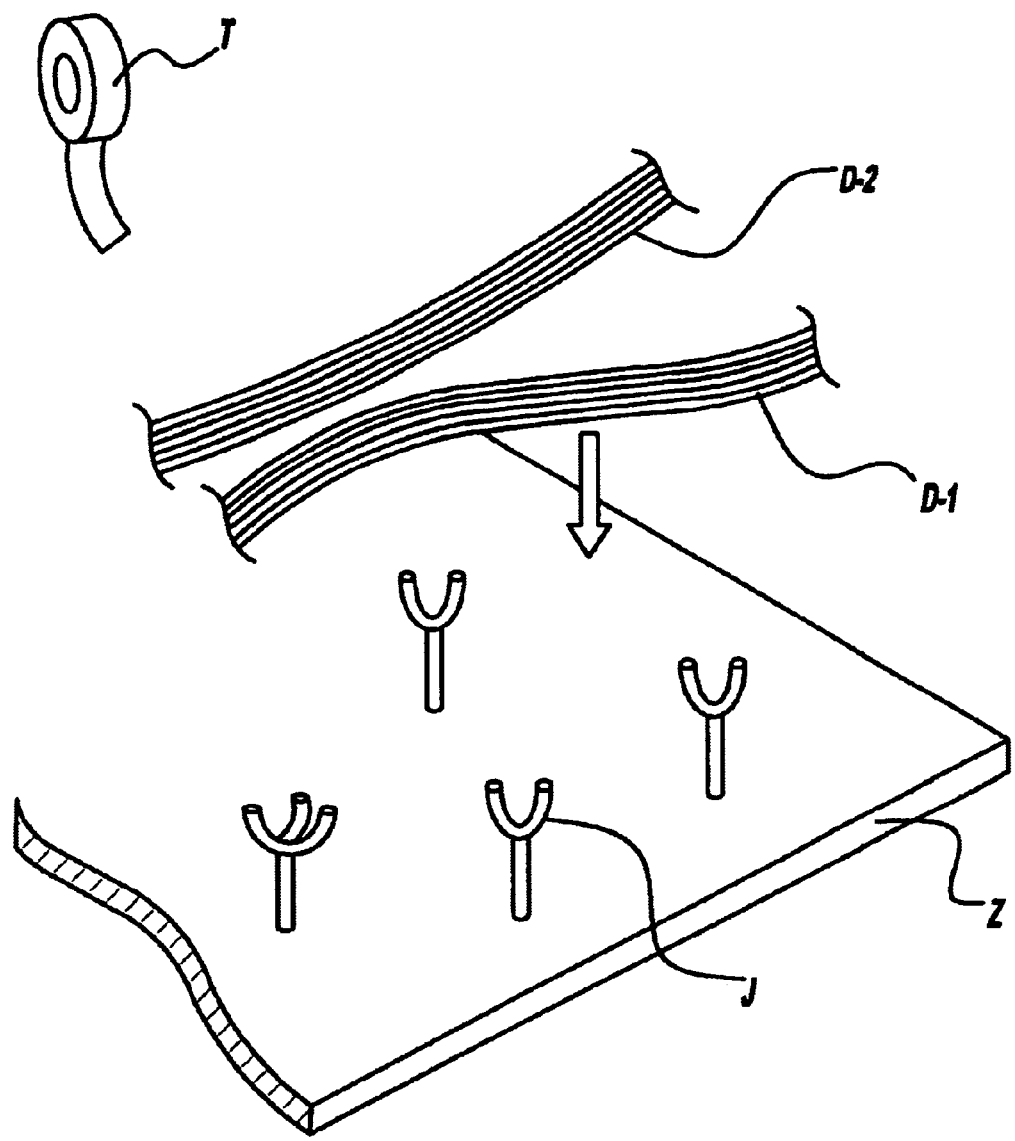
FIG. 9 is a schematic view illustrating a condition in which wires are laid in jigs upstanding from an assembly board.
Figure 10A:
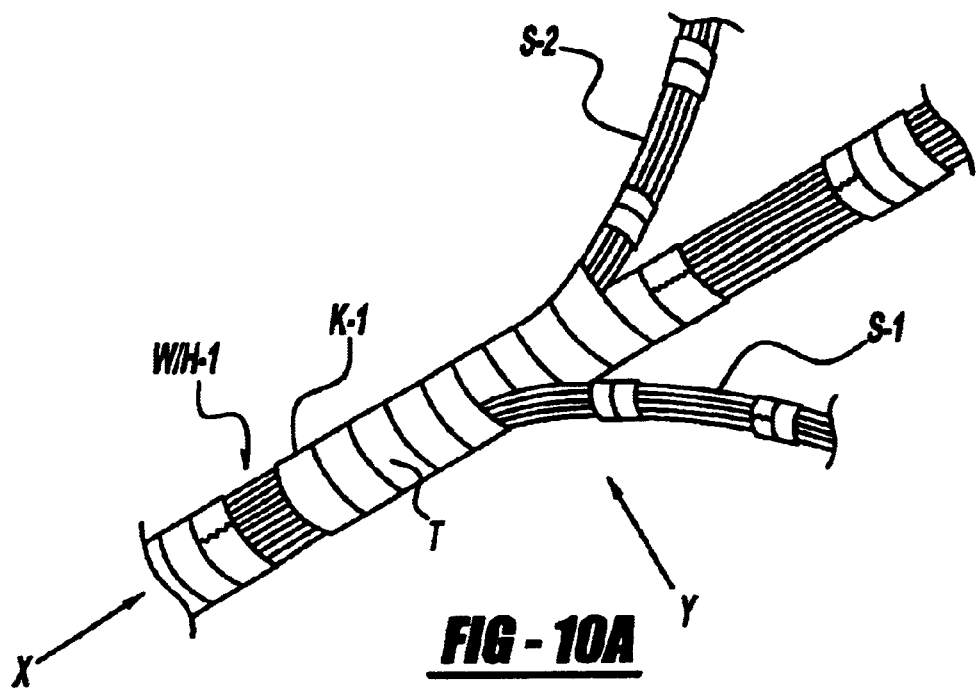
FIG. 10(A) is a perspective view of a conventional wire harness.
Figure 10B:
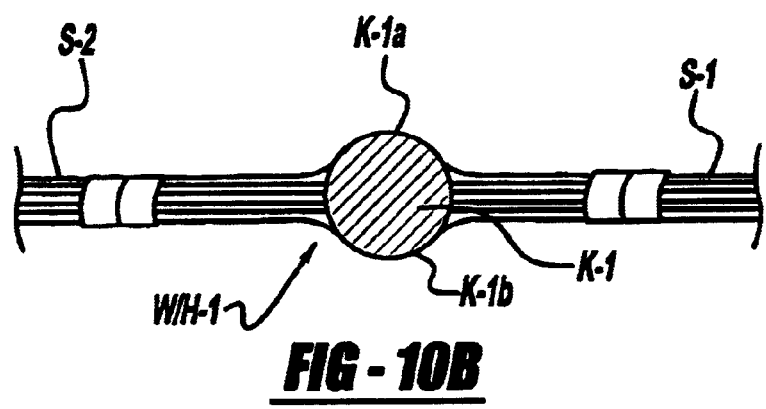
FIG. 10(B) is a cross-sectional view taken along the line X—X of FIG. 10(A)
Figure 10C:
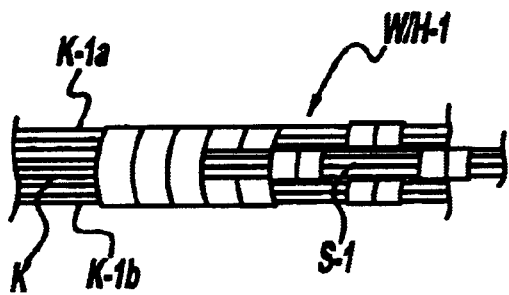
FIG. 10(C) is a cross-sectional view taken along the line Y—Y of FIG. 10(A)

FIG. 1 illustrates a wire harness W/H-10 according to the first embodiment of the present invention. The wire harness W/H-10 has a trunk line K-10 and two branch lines S-11, S-12 that branch from the trunk line K-10. These trunk and branch lines K10, S-11, S-12 are conventionally assembled as shown in FIG. 9. Wire tie members 10 are provided at or adjacent branch portions to regulate the routing orientations of the branch lines S-11, S-12. Unlike the prior art construction, tape is not wound at the branch portions.

Figure 2:
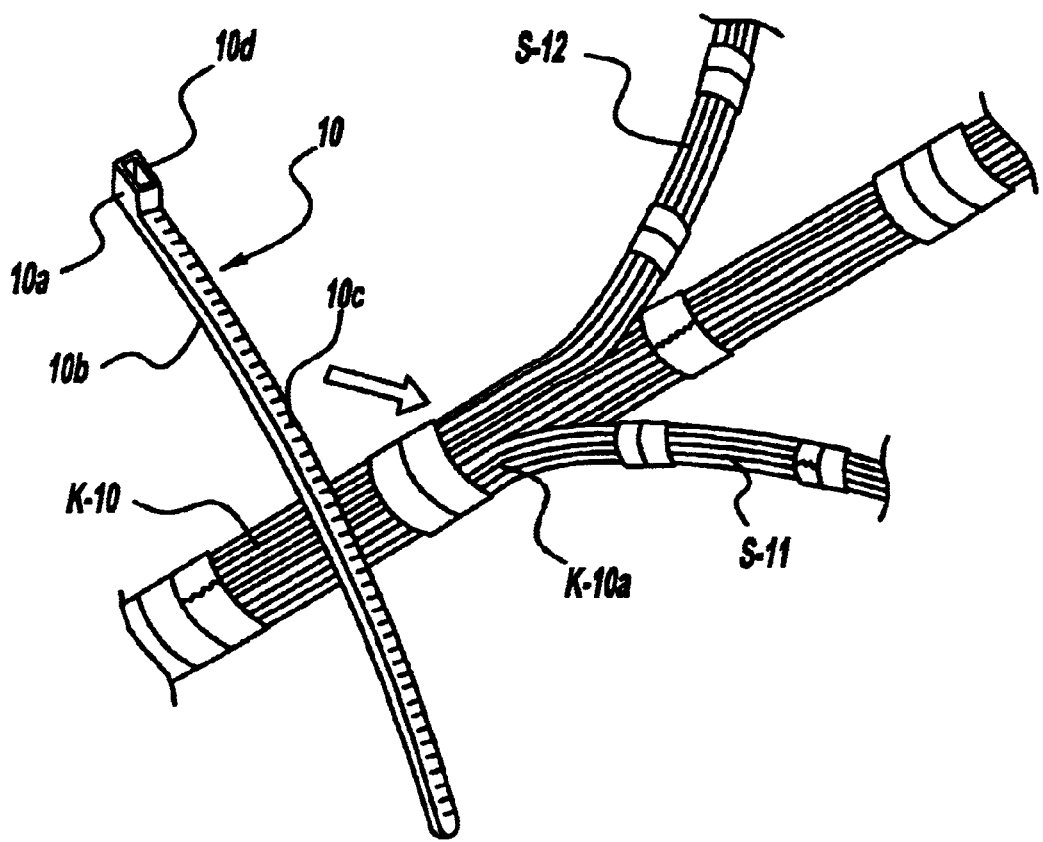
FIG. 2 is a perspective view illustrating a condition prior to mounting a wire tie member to the trunk line of the wire harness according to the first embodiment of the present invention.

The wire tie members 10, as shown in FIG. 2, are commonly used, conventional products which are one-piece, unitary members made of resin. The wire tie member 10 includes a buckle 10a in the form of a block. A tie strap 10b has saw-teeth locking portions on an outer surface and extends from the buckle 10a. The buckle 10a is provided with a through hole 10d. A locking tab (not shown) projects into the through hole 10d to interlock the tie strap 10b in the interior of the buckle 10b.

Figure 3A:
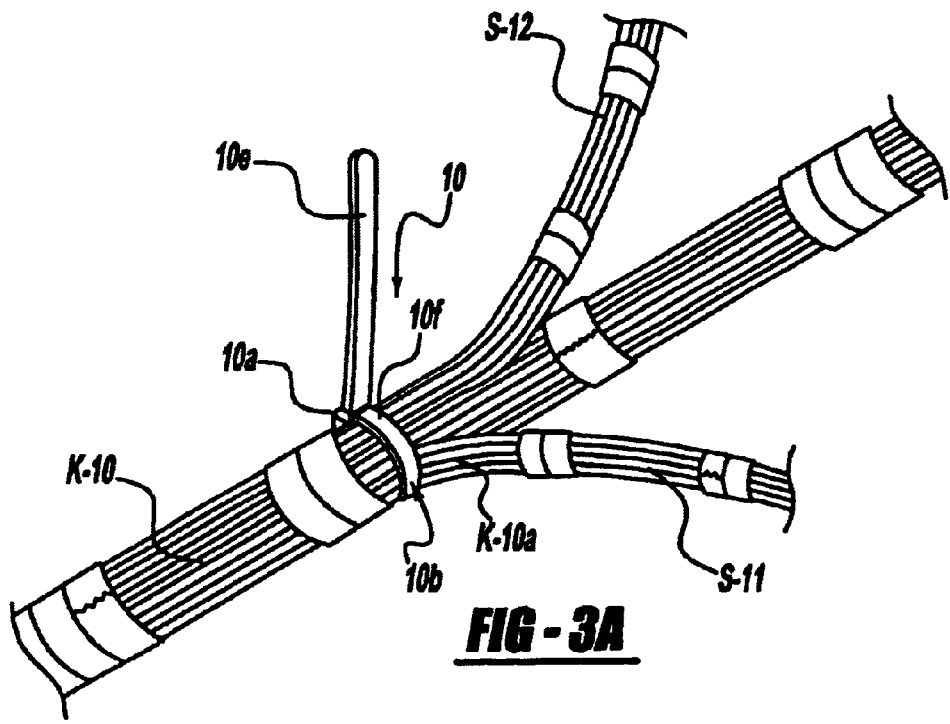
FIG. 3(A) is a perspective view illustrating a condition in which the wire tie member is mounted on the trunk line according to the first embodiment of the present invention.

The tie strap 10b of the wire tie member 10 has a non-tying portion 10e which passes through the through hole 10d and extends beyond the buckle 10a. The tie strap also has a tying portion 10f which encircles and tightly holds the trunk line K-10. As shown in FIGS. 3(A) and (B), the wire tie member 10 is provided adjacent a root portion K-10 (branch portion) where the branch line S-11 branches from the trunk line K-10. The non-tying portion 10e projects in substantially the same orientation as the predetermined routing orientation of the branch line S-11 when it is installed to the vehicle body.

Figure 3B:
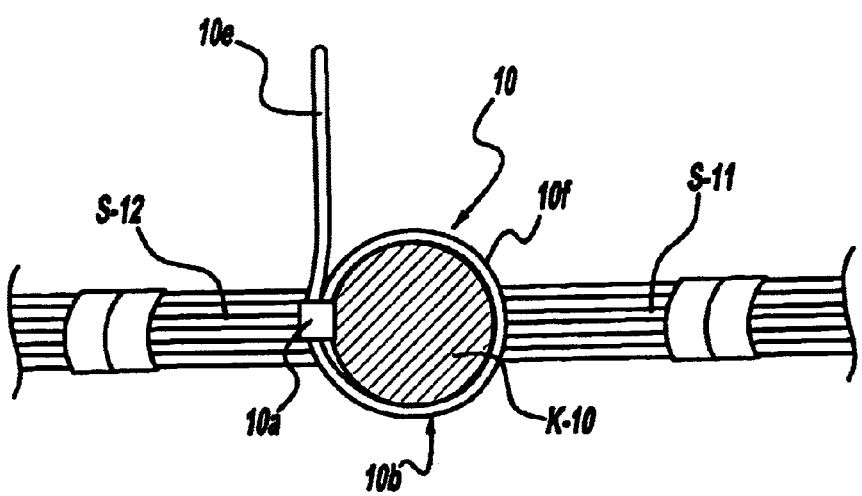
FIG. 3(B) is a cross-sectional view of FIG. 3(A)

More specifically, as shown in FIG. 3(B), the non-tying portion 10e projects in a direction right above the trunk line K-10, which corresponds to the predetermined routing orientation of the branch line S-11. Further, the wire tie member 10 is mounted so that the buckle 10a is positioned at a location opposite to the branch portion of the branch line S-11. As seen, the buckle 10a is at the left side of the trunk line K-10. Thus, the branch line S-11 can be guided in the direction right above the trunk line K10. Consequently, the non-tying portion 10e project upwardly at the left side of the trunk line K-10.

Figure 4A:
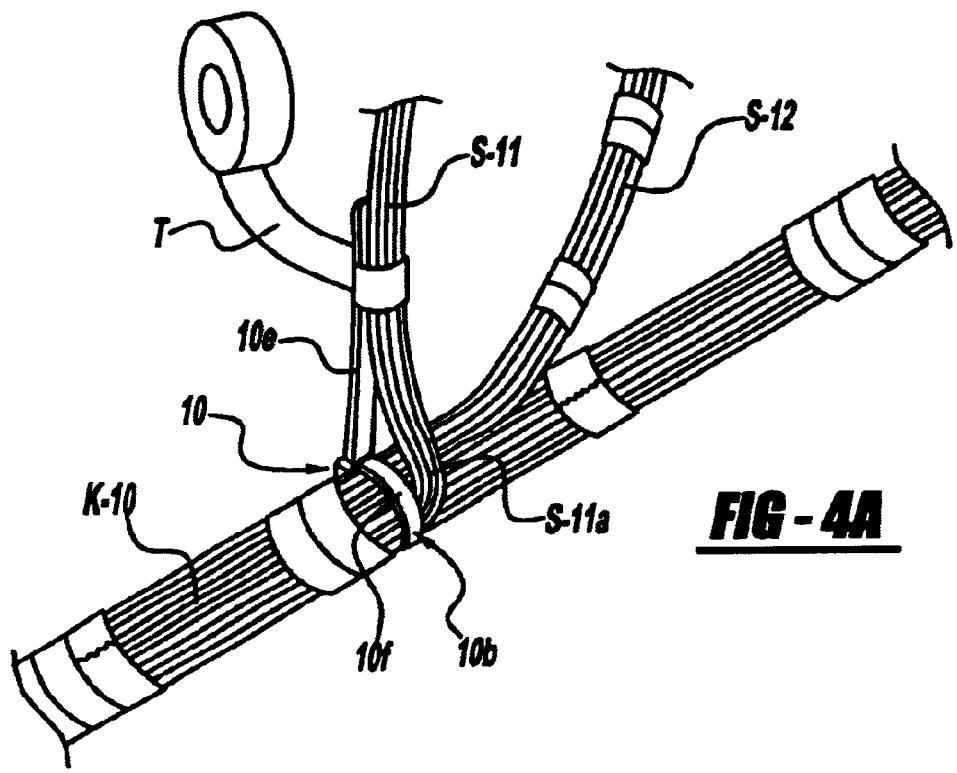
FIG. 4(A) is a perspective view illustrating a process of attaching the wire tie member to the branch line of the wire harness according to the first embodiment of the present invention.
Figure 4B:
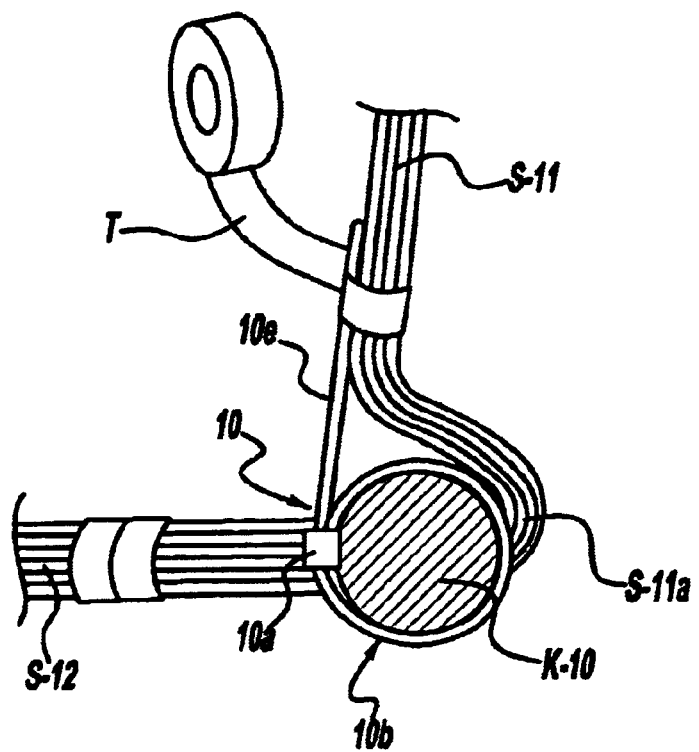
FIG. 4(B) is a cross-sectional view of FIG. 4(A)

As shown in FIGS. 4(A) and (B), the branch line S-11 is raised, then disposed along the non-tying portion 10e of the tie strap. A securing member T, such as an adhesive tape T, is wound around the branch line S-11 to secure the branch line S-11 to the non-tying portion 10e of the tie strap. Thus, the non-tying portion 10e supports the branch line S-11 in the predetermined routing orientation. Apart from the adhesive tape T, other suitable securing members such as a wire tie band, an adhesive sheet and a fastener could be employed to secure the non-tying portion 10e and the branch line S-11 together. Also, the wire tie member 10 may be mounted at other branch portions (not shown) of the wire harness W/H-10 so that other branch lines branching from those branch portions can be supported in their predetermined routing orientations.

The non-tying portion 10e is preferably made of nylon or other suitable materials which provide sufficient stiffness or rigidity to support the branch line S-11 in the predetermined routing orientation.

The tape T is wound from a location sufficiently away from the root portion K10a, which prevents the root portion K-10a from bulging. The tape T is also wound at an end portion of the non-tying portion 10e. This prevents the end portion 10e from moving away from the branch line S-11 and interfering with surrounding parts.

In this manner, the branch line S-11 can be routed right above the trunk line K-10 as required. Similarly, the wire tie member 10 is fixed at or adjacent the branch portion of the branch line S-12. Thus, the non-tying portion projects in a predetermined routing orientation of the branch line S-12, and is secured to the branch line S-12. Thereafter, upon attachment of necessary parts such as connectors and clips, as shown in FIG. 1, the wire harness W/H-10 is completed.

Figure 5:
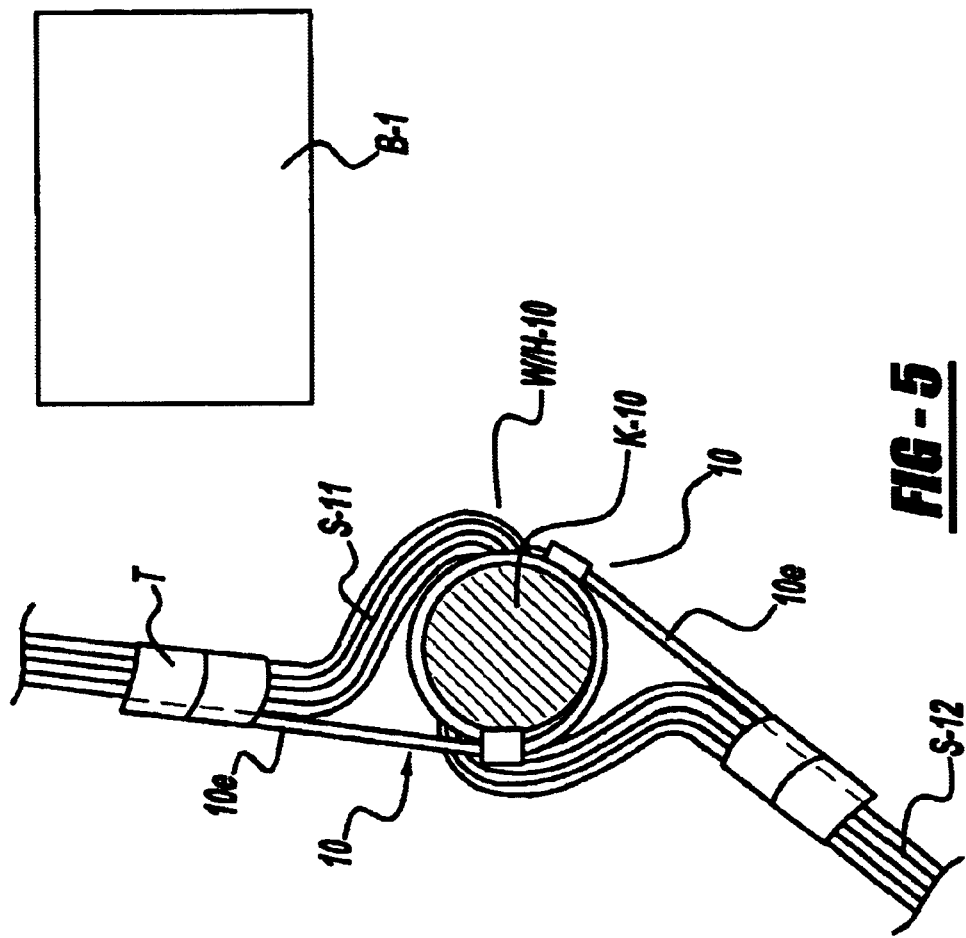
FIG. 5 is a schematic cross-sectional view illustrating a condition in which the wire harness is installed to a vehicle body according to the first embodiment of the present invention.

The completed wire harness W/H-10 is installed on a vehicle body as shown in FIG. 5. The branch lines S-11, S-12 are routed in the predetermined orientation. Accordingly, the branch lines S-11, S-12 avoid interference of the branch lines S-11, S-12 with surrounding parts B1, B-2. This eliminates the need to attach protecting parts, such as a sheet and a tube, to the branch lines S-11, S-12. Further, since the tape 1 is not wound at the branch portions, the branch portions do not bulge. This reduces necessary routing space, as compared with the prior art construction of the wire harness W/H-1 as shown in FIG. 11.

Figure 6:
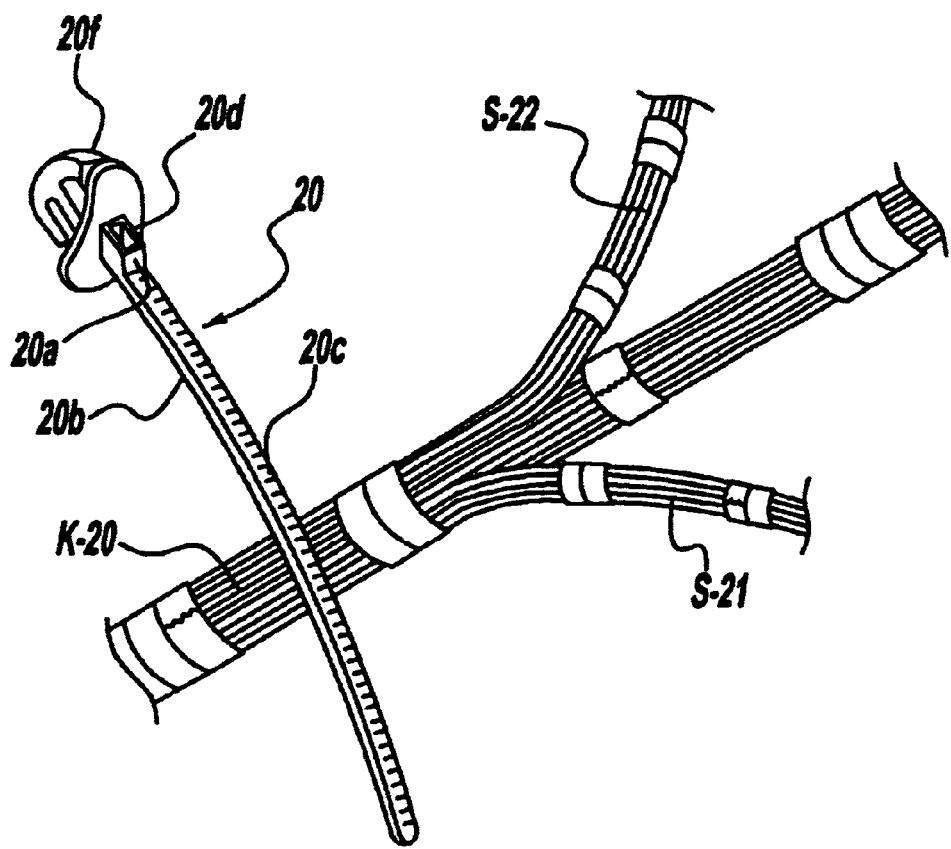
FIG. 6 is a perspective view of a wire tie member according to a second embodiment of the present invention.

FIG. 6 shows a wire tie member 20 according to a second embodiment of the present invention. The wire tie member 20 has a wing-shaped locking clip portion 20$f$ of which projects from one side of a buckle 20$a$. Apart from the locking clip portion 20$f$, the wire tie member 20 has a similar configuration to the wire tie member 10 according to the first embodiment of the present invention. A tie strap 20$b$ has saw-teeth locking portions 20$c$ and extends from the buckle 20$a$, which includes a through hole 20$d$.

The trunk line K-20 and the branch lines S-21, S-22 of a wire harness W/H-20 are assembled in a similar manner as in the case of the wire harness W/H-10 according to the first embodiment of the present invention. A tape is not wound at branch portions where the branch lines S-21, S-22 branch from the trunk line K-20. The wire tie member 20 is mounted at or adjacent the branch portion where the branch line S-21 branches from the trunk line K-20. The tie strap 20$b$ has a non-tying portion and a tying portion. The non-tying portion passes through the through hole 20$d$ of the buckle 20$a$ and projects beyond the buckle 20$a$. The tying portion encircles and tightly holds the trunk line K-20. The wire tie member 20 is mounted such that the non-tying portion projects in substantially the same orientation as the predetermined routing orientation of the branch line S-21, i.e., in the upward orientation as shown in FIG. 7(A). With regard to the branch line S-22, a wire tie member without a locking clip, which is similar to the wire tie member 10 of the first embodiment of the present invention, is employed to regulate the routing orientation of the branch line S-22.

As shown in FIGS. 7(A) and (B), the locking clip portion 20$f$ of the wire tie member 20 is inserted into an engaging hole Pa of a vehicle body panel P. Thus, the completed wire harness W/H-20 is secured to a vehicle body. The wire tie member 20 (provided with the locking clip 20$f$) is employed at a location where the branch portion is fixed to the vehicle body. Thus, it serves the double function of supporting the branch line S-21 in the predetermined routing orientation and fixing the wire harness W/H-20 to the vehicle body. Accordingly, the number of clip members which are adapted to fix a wire harness to the vehicle body can be reduced.

Figure 8:
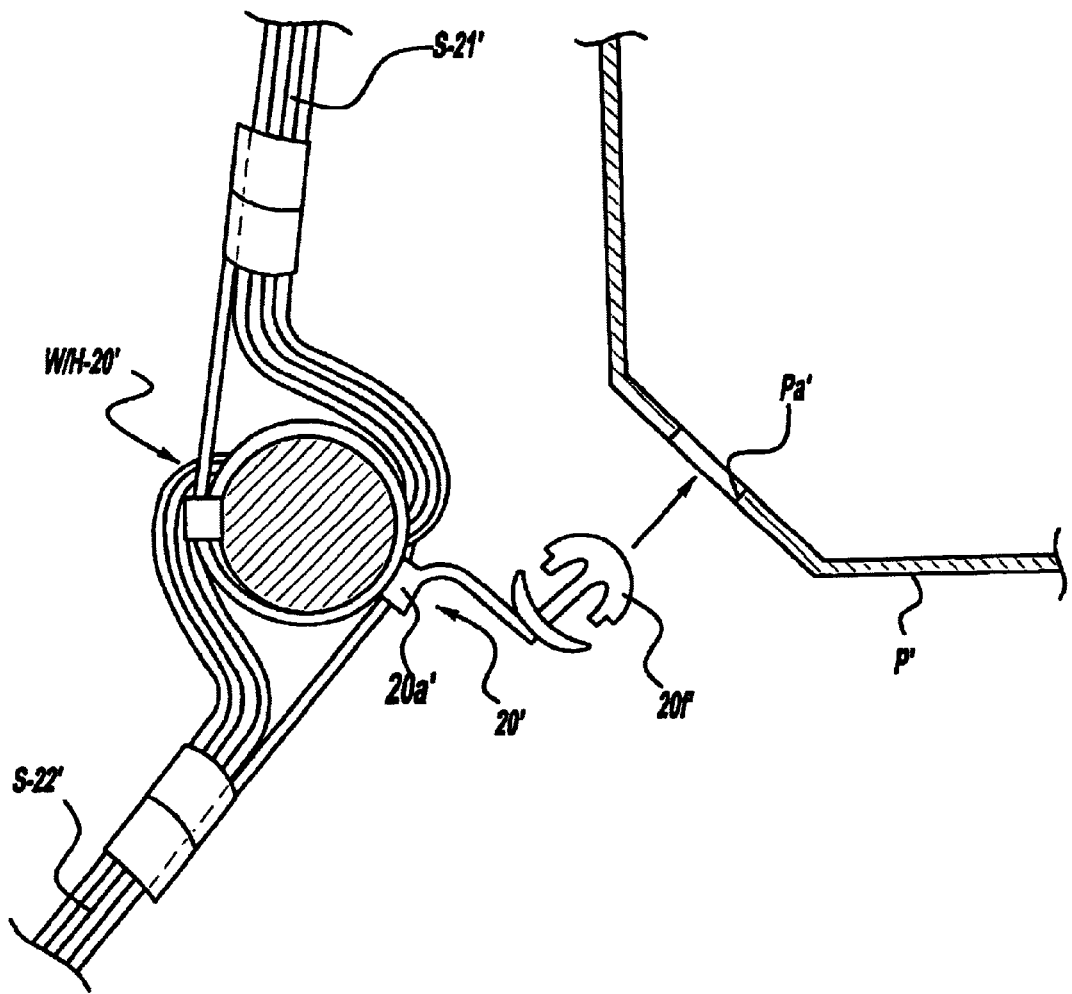
FIG. 8 is a schematic cross-sectional view illustrating a variation of the wire harness according to the second embodiment of the present invention.

Apart from the wire tie member 20 as shown in FIGS. 7(A) and (B), a wire tie member 20', as shown in FIG. 8, may be employed to install the wire harness W/H-20' to the vehicle body. The wire tie member 20' has a locking clip portion 20'$f$ which projects from a buckle 20$a$ in a direction toward an engaging hole of a vehicle body panel P'. More specifically, the locking clip portion 20$f'$ projects in an offset manner from an axis of a tie strap in a pre-mounting condition. Comparatively, the locking clip 20$f$ shown in FIG. 6 projects along an axis of the tie strap in a pre-mounting condition.

As is apparent from the above description, the present invention has the following advantages, among other things. A branch line secured to and supported by a wire tie member, can be accurately routed in a predetermined routing orientation. Accordingly, it is possible to decrease the likelihood of the branch line interfering with surrounding parts. This reduces the number of protecting parts such as a tube and a sheet to be mounted on a wire harness. Also, the branch line can be easily routed in a predetermined routing orientation. Accordingly, it is possible to improve routing efficiency. A location of a non-tying portion can be readily adjusted, while tightening a tie strap around the bundle of wires. Consequently, it can be mounted such that the non-tying portion projects in any desired orientation.

Further, a conventional wire tie member such as the one which is normally used for a wire harness, can be used. This eliminates the need to design, develop and tool a new, special tie member. Accordingly, this minimizes material and manufacturing costs.

Furthermore, the non-tying portion can be effectively utilized, reducing the amount of discarded waste. Normally, a non-tying portion of the wire tie member is removed and discarded as an unwanted portion after the wire tie member is mounted on the bundle of wires.

Additionally, when a wire tie member is provided with a locking clip, it is possible to fix a wire harness to a vehicle body at a location where such a wire tie member is mounted. This reduces the number of body engaging members such as a clip member.

While the invention has been described in the specification and illustrated in the drawings with reference to preferred embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A wire harness comprising:
   a trunk line having a bundle of wires;
   a branch line having at least one wire and branching from the trunk line at a branch portion; and
   a wire tie member having a tie strap and a buckle, a non-tying portion of the tie strap passing through and extending beyond the buckle in a desired direction, a tying portion of the tie strap encircling and holding the bundle of wires of the trunk line adjacent the branch portion, wherein the branch line is disposed along and is tightly secured to the non-tying portion of the tie strap, said branch line projecting from said trunk line in the direction of said non-tying portion so that the branch line can be supported in a predetermined routing orientation relative to the trunk line.

2. The wire harness of claim 1, wherein the wire tie member is mounted in such a manner that the non-tying portion of the tie strap projects in substantially the same orientation as the predetermined routing orientation of the branch line.

3. The wire harness of claim 1, further comprising a securing member for tightly securing the branch line to the non-tying portion of the tie strap.

4. The wire harness of claim 3, wherein the securing member is an adhesive tape.

5. The wire harness of claim 1, wherein the securing member is secured at least near a protruding end of the non-tying portion, preventing the protruding end from moving away from the branch line and interfering with surrounding parts when the branch line is routed in the predetermined routing orientation.

6. The wire harness of claim 1, wherein the wire tie member comprises an engaging portion projecting from the buckle for engaging the branch portion to a panel member.

7. The wire harness of claim 6, wherein the engaging portion projects along an axis of the tie strap in a pre-mounting condition.

8. The wire harness of claim 6, wherein the engaging portion is offset from an axis of the tie strap in a pre-mounting condition.

9. The wire harness of claim 1, wherein the wire tie member is a one-piece unitary member made of resin.

10. A wire harness comprising:
 a trunk line having a bundle of wires;
 a branch line having at least one wire and branching from the trunk line at a branch portion;
 a wire tie member having a tie strap for encircling the bundle of wires of the trunk line and a buckle provided at one end of the tie strap for enabling the other end of the tie strap to pass through the buckle and for engaging the tie strap intermediate the ends to secure the tie strap in place on the bundle of wires; and
 a non-tying portion extending between the other end of the tie strap and the buckle in a desired direction and projecting in substantially the same orientation as a predetermined routing orientation of the branch line;
 wherein the wire tie member is mounted adjacent the branch portion, wherein the branch line is disposed along, and is tightly secured to the non-tying portion, whereby the branch line projects in the direction of said non-tying portion and is supported in the predetermined routing orientation relative to the trunk line.

11. The wire harness of claim 10, further comprising a separate securing member for tightly securing the non-tying portion to the branch line.

12. The wire harness of claim 10, further comprising an engaging portion projecting from the buckle for engaging the branch portion to a panel member.

13. The wire harness of claim 10, wherein the securing member is secured at least near a protruding end of the non-tying portion, preventing the protruding end from moving away from the branch line and interfering with surrounding parts when the branch line is routed in the predetermined routing orientation.

\* \* \* \* \*